No. 788,474. PATENTED APR. 25, 1905.
L. B. KELLER.
CELERY TRIMMER.
APPLICATION FILED AUG. 28, 1903.
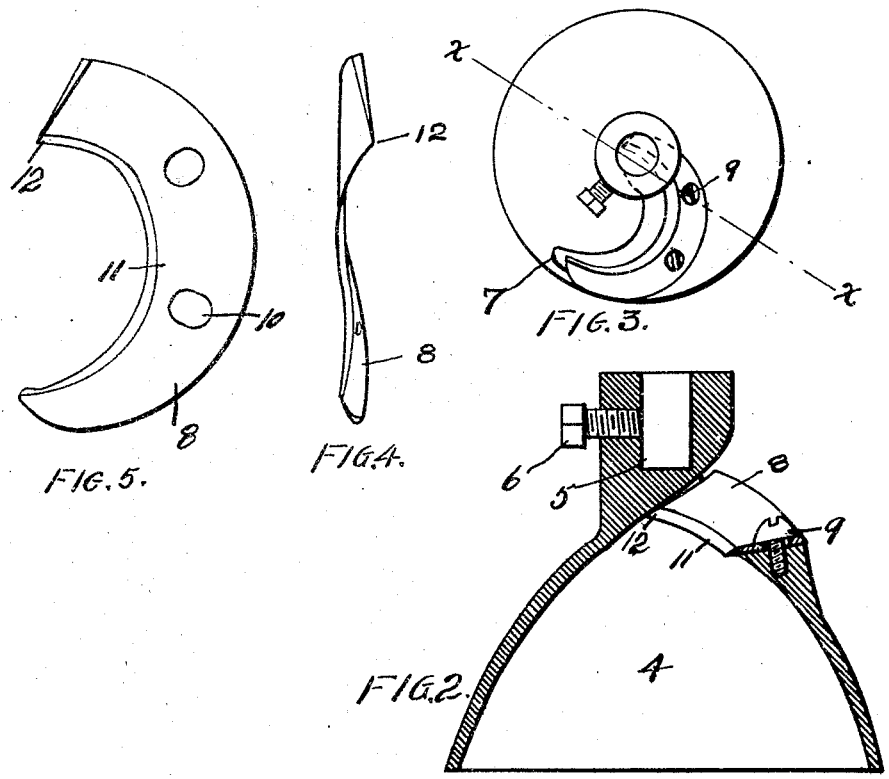
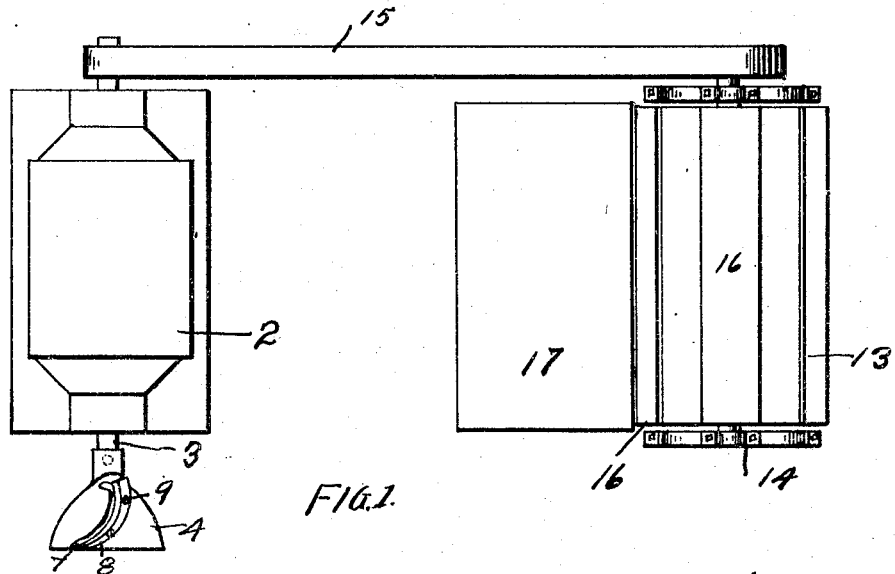
Witnesses.
Inventor
Louis B Keller
By Paul & Paul
His Attorneys.

No. 788,474.

Patented April 25, 1905.

UNITED STATES PATENT OFFICE.

LOUIS B. KELLER, OF MINNEAPOLIS, MINNESOTA.

CELERY-TRIMMER.

SPECIFICATION forming part of Letters Patent No. 788,474, dated April 25, 1905.

Application filed August 28, 1903. Serial No. 171,035.

*To all whom it may concern:*

Be it known that I, LOUIS B. KELLER, of Minneapolis, county of Hennepin, State of Minnesota, have invented certain new and useful Improvements in Celery-Trimmers, of which the following is a specification.

In preparing celery for the market it is customary to trim off the roots and discolored portions, leaving a clean white bulb uniting the butts of the stalks at the bottom of the plant. This has usually been done with a knife held in the hand and involves the expenditure of considerable time and labor.

The object of my invention is to provide a device by means of which the butt-end of a celery-plant, beginning at the bottom, can be readily and easily trimmed, leaving it sufficiently large at the top to hold the ends of the stalks together.

A further object is to provide means for trimming the top of a plant.

The invention consists generally in a revolving cup-shaped device and a curved knife fitted therein and adapted to form an egg-shaped bulb at the bottom of the plant.

Further, the invention consists in various constructions and combinations, all as hereinafter described, and particularly pointed out in the claim.

In the accompanying drawings, forming part of this specification, Figure 1 is a plan view of a celery-trimmer embodying my invention. Fig. 2 is a vertical section of the cup-shaped device wherein the trimming-knife is mounted, taken substantially on the line *x x* of Fig. 3. Fig. 3 is an end view showing the outside of the cup. Fig. 4 is an edge view of the cutting-knife. Fig. 5 is a plan view of the same.

In the drawings, 2 represents an ordinary electric motor having a shaft 3, and 4 is a cup-shaped device having a socket 5 at one end to receive the end of said shaft and secured thereon by a set-screw 6. The walls of the cup, as shown in Fig. 2, are rounded slightly from the bottom toward the top to form a correspondingly-shaped bulb at the bottom of the celery-plant. A curved slot 7 is provided in the wall of the cup, extending from the center thereof toward its upper end.

8 is a knife fitting within the slot 7 and adjustably secured to the walls of the cup by set-screws 9, passing through slots 10 in said knife. The knife-blade is provided with a sickle-shaped cutting edge 11, terminating in a point 12, that intersects the axis of revolution, the portion of the blade near its inner end being twisted forward in the direction of the open end of the cup to adapt the blade to engage and trim the bottom of the plant before the main portion of the blade comes in contact therewith. The effect of this arrangement of the knife is to produce an egg-shaped bulb at the bottom of the celery-plant, trimming off the roots at the bottom and the discolored or soiled parts of the sides, leaving, however, sufficient stock to support and hold together the outer stalks of the plant and prevent them from becoming loosened and separated from the inner portion.

A reel 13 is mounted in suitable bearings 14 near the motor 2 and driven from said motor by a belt 15. This reel is provided with a series of longitudinally-arranged knives 16, which when the reel is revolved pass near the edge of a stationary table 17, arranged near said reel.

The operation of the machine is as follows: The attendant grasping a celery-plant inserts the butt-end thereof into the cup 4 and into engagement with the cutting edge 12, which has previously been adjusted to engage the roots at the bottom of the plant before the cutting edge 11 comes in contact with it. The roots having been removed by the rapidly-revolving knife, the attendant will press the plant still farther into the cup until the cutting edge 11 comes in contact with the bulb, when the outer discolored husks will be quickly removed and the bottom of the plant will assume a bulb or egg-shaped form that will be clean and white and present a marketable appearance and at the same time sufficiently large at the top to support the outer stalks of the celery. If the top of the plant is broken or decayed, the operator will lay it upon the table 17, with the top projecting over the edge thereof, where it will be engaged and quickly trimmed by the rapidly-revolving knives.

I am aware that devices corresponding in construction to what I have herein shown and described are used in pencil-sharpeners and other similar tools, and hence I make no claim, broadly, to the same herein, my invention relating particularly to the knife with the curved edge for first removing the roots at the bottom of the plant and then causing the bulb to assume an egg-shaped form with sufficient body at the top to insure a support for the outer stalks.

I claim as my invention—

In a celery-trimmer, the combination with a shaft, of a cup secured thereon and having a slot in its wall, and a knife-blade secured in said slot, said blade having a sickle-shaped edge and intersecting the axis of the revolution, the portion of the blade near its inner end being twisted forward in the direction of the open end of the cup, to adapt the blade to engage and trim the bottom of the plant-stalk before the knife-edge comes in contact with the upper portion of the stalk, substantially as and for the purposes described.

In witness whereof I have hereunto set my hand this 24th day of August, 1903.

LOUIS B. KELLER.

In presence of—
RICHARD PAUL,
S. V. GRIFFIN.